United States Patent [19]

Britton et al.

[11] 4,012,479
[45] Mar. 15, 1977

[54] METHOD OF FORMING BELTED RADIAL TIRES FROM A CYLINDRICAL TIRE BAND

[75] Inventors: James Earl Britton, Akron; Joseph L. Grant, North Canton; John Alan Welch, Cuyahoga Falls, all of Ohio

[73] Assignee: The General Tire & Rubber Company, Akron, Ohio

[22] Filed: Nov. 3, 1975

[21] Appl. No.: 628,436

[52] U.S. Cl. .......................... 264/315; 156/128 T; 425/33
[51] Int. Cl.² ..................... B29H 5/02; B29H 17/14
[58] Field of Search .................. 264/36, 315, 326; 425/31–33; 156/123, 128 I

[56] References Cited

UNITED STATES PATENTS

| | | | |
|---|---|---|---|
| 3,373,066 | 3/1968 | Hindin | 156/128 R |
| 3,518,140 | 6/1970 | Smithkey | 156/123 |
| 3,558,389 | 1/1971 | Bezbatchenko, Jr. | 156/126 |
| 3,720,252 | 3/1973 | Batten et al. | 156/128 R X |
| 3,850,219 | 11/1974 | Snyder | 156/128 I X |
| 3,901,751 | 8/1975 | Wilson | 156/123 X |
| 3,916,969 | 11/1975 | Auerbach et al. | 156/123 X |

*Primary Examiner*—Jan H. Silbaugh

[57] ABSTRACT

Discloses method of forming a belted radial tire from a cylindrical radial green tire band having biased corded belts which are adapted to pantograph and expand circumferentially as the tire band is shaped to be molded into a finished tire without "S-ing" of the radial cords of the carcass plies under the belts of the finished tire as may be caused by the pantograph action of the belts while the tire band is being expanded into finished shape. Involves lowering a belted radial green tire band of generally cylindrical shape to seat into a conventional tire molding press over the inflatable curing bladder, then applying inflation pressure into the curing bladder to a first pressure level while partially closing the press. The inflation pressure is continued to a second pressure level while continuing to close the press. The belts pantograph and circumferentially expand substantially completely through application of the second pressure until the tire band has reached a generally circular U-shape. The second pressure level is held while the press is in partially open position for a sufficient time interval to retain the belts in expanded position while the carcass cords under the belts stretch to be disposed at substantially 0° with respect to the tire axis. The pressure is then lowered from the second pressure level to about the same as the first pressure level while the press remains partially open to permit ready closure of the press about the tire band. Then the press is fully closed and the higher molding pressure and temperature is applied to cure the tire band into a finished tire as usual.

11 Claims, 5 Drawing Figures

METHOD OF FORMING BELTED RADIAL TIRES FROM A CYLINDRICAL TIRE BAND

SUMMARY OF THE INVENTION

This invention generally relates to the molding and curing of pneumatic vehicle tires and more particularly to the forming and molding of belted radial tires in a conventional tire molding and curing press which are built up on a conventional bias ply tire building machine. Such presses are shown in U.S. Pat. Nos. 2,715,245 and 3,298,066, for example, and herein incorporated by reference.

The outer belts under the tread and over the carcass of a belted radial tire may be formed of steel wire, fiberglass, polyester or the like, which, when applied to a cylindrical radial tire carcass, may be biased and disposed at about 55° with respect to the tire axis. An exemplary radial tire may include two radial carcass plies overlaid with two biased belts of steel wire.

A method of building up such radial tires is disclosed in commonly assigned U.S. application Ser. No. 621,178, filed Oct. 9, 1975 now abandoned, for "Method of Building Radial Tires," and its continuation-in-part and now pending U.S. application Ser. No. 717,847, filed Aug. 26, 1976. Briefly, the method involves building radial tires in which the complete uncured or green tire bands can be built on the hard flat drums previously used only for building bias type tires. After assembling the inner liner, the radial plies and the bead assemblies into a tire carcass assembly, a lubrication film, such as zinc stearate is applied over the carcass and/or the sidewall assemblies prior to attachment of the belt and tread assemblies. A non-lubricated section is left around the middle of the carcass. The tread assembly is attached to the carcass only in this non-lubricated section. The lubrication film allows the belts to pantograph with very small interference with the radial cord in the carcass when the tire is expanded under fluid pressure within the closed tire press.

The zinc stearate is absorbed as part of the rubber when the tire is cured. The pantograph action increases the bias angle from about 55° to about 70°, for example with respect to the axis of the finished tire. However, the small interference previously mentioned tends to bend the radial carcass ply cords in the vicinity of the unlubricated section into an "S" configuration with the cords at the middle of the S being deviated from the initial 0° with respect to the tire axis to possibly 12°–13°, as an example. Such "S-ing" is not always uniform and is therefore considered to be objectionable as creating a possible source of non-uniformity in the finished tire.

SUMMARY OF THE INVENTION

This invention provides a method of forming, molding and curing a belted radial tire built up with conventional bias ply tire machinery without objectionable S-ing of the radial cords under the belts of the finished tire.

The foregoing provision is attained in a method of forming a belted radial tire from a cylindrical radial green tire band having biased corded belts which are adapted to pantograph and expand circumferenetially as the tire band is shaped to be molded into a finished tire without S-ing of the radial cords of the carcass plies under the belts of the finished tire as may be caused by the pantograph action of the belts while the tire band is being expanded into finished shape. The method involves lowering a belted radial green tire band of generally cylindrical shape into a conventional tire molding press over the inflatable curing bladder until the lower bead of the tire band is seated in the lower bead seat of the press, then applying inflation pressure into the curing bladder to a first pressure level before and while partially closing the press. The application of inflation pressure is continued to a second pressure level while continuing to close the press. The belts pantograph and circumferentially expand primarily through application of the second pressure level until the tire band has reached a generally circular U-shape. The said second pressure level is held while the press is in partially open position for a sufficient time interval to retain the belts in expanded position while the carcass cords under the belts stretch to be disposed at substantially 0° with respect to the tire axis. The pressure is then lowered from the second pressure level to about the same as the first pressure level to permit ready closure of the press about the tire band. Then the press is fully closed before applying the higher molding pressure and temperature to cure the tire band into a finished tire as usual.

DESCRIPTION OF THE PREFERRED EMBODIMENT

As seen in FIGS. 1–4, the tire 10 has radial cords 12 in the tire carcass overlaid by bias belts 14 and 16 and a tread 18. The tire 10 is first built into a generally cylindrical tire band TB (FIG. 4) as mentioned above and described in the referenced copending U.S. application Ser. No. 621,178.

Figure 1:
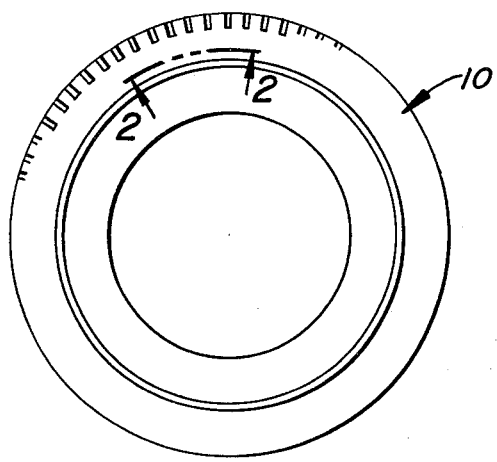
FIG. 1 is side elevational view of a typical radial tire.
Figure 2A:
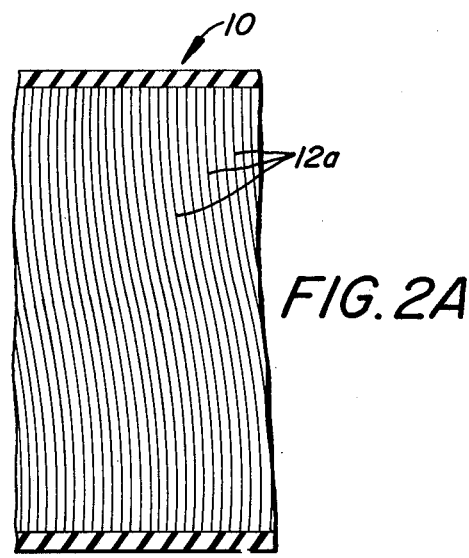
FIG. 2A is a cross-sectional view taken along line 2—2 of FIG. 1 showing a section under the tread of a tire with the liner cut away to expose a ply of cords having an S shape.
Figure 2B:
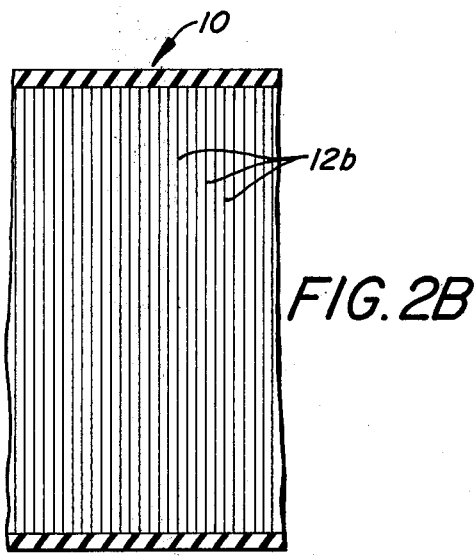
FIG. 2B is the view of FIG. 2A with the tire after being formed, molded and cured with the method of the present invention.

FIG. 2A shows the S-ing problem and possible nonuniformity of radial cords 12A which is solved by the method of the present invention. FIG. 2B shows the radial cords 12B uniformly disposed at 0° with reference to the axis of tire 10 when tire 10 is formed and shaped out in the mold with the method of the present invention.

Briefly described with reference to FIG. 4, a tire molding press 19 is provided as partly and schematically shown. The press 19 incorporates an upper mold section 20 and a matching lower mold section 22. As shown, an inflatable curing bag or bladder 24 is mounted between the mold sections and clamped to effect a fluid seal between a plate hub 26 and a clamp ring 29 at its upper end and a lower bead ring 30 and a plate ring 32 at its lower end. Clamp ring 29 removably fits in an upper bead ring 28 which in turn is mounted in upper mold section 20. A hub member 34 is mounted into a lower center mechanism as described in referenced U.S. Pat. No. 2,715,245. Schematically shown with hub member 34, are a vacuum and pressurizing media conduit 36 and a drain conduit 38. A shaft 40, powered from the center mechanism 35, raises the hub member 34 upwardly to a distance where bladder 24, when deflated, will pass through the beads of a radial tire band TB. Mounted above upper mold section 20 is an upper heating platen 42 and below lower mold section 22 is a lower platen 44. The press 19 is mounted on a bed plate 46 supported by a frame 48.

IN METHOD OF OPERATION OF THE INVENTION

Initially, the upper mold assembly, including mold section 20 and bead ring 28, are in a raised and withdrawn position. The bladder 24 is deflated and raised by shaft 40 and hub 26 to a height permitting a cylindrically shaped tire band TB to be lowered into position with its lower bead seated with lower bead ring 30.

The upper mold section 20 is then lowered, with the plate hub 26 later being lowered after bead ring 28 encounters clamp ring 29 and until bead ring 28 is seated with the upper bead of tire band TB. Usually before the upper bead of TB is seated with bead ring 28, the bladder 24 begins to be inflated and expanded within tire band TB by a pressurizing fluid such as air, or more usually, steam through conduit 36. The bladder 24 begins to be inflated before or during the closing of press 19.

The pressurizing of bladder 24 and the lowering of mold section 20 continues with the air between the bladder being vented through vents such as vent 50.

The pressurizing of bladder 20 is increased to a first pressure level while press 19 is closing. The best first pressure level has been found to be about 25 psig (170 KPa).

Application of inflation pressure is continued to a second pressure level while press 19 continues to close. The belts 14 and 16 pantograph and circumferentially expand substantially completely through application of pressure to the second pressure level. At this time tire band TB has reached substantially the full diameter appropriate for enclosure within press 19.

Figure 3:
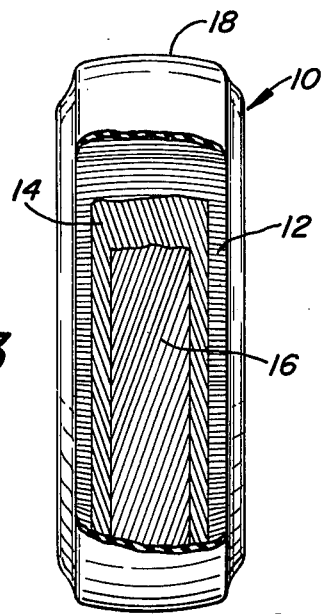
FIG. 3 is another side elevational and partially cut away view of the tire of FIG. 1 showing a ply of radial cords overlaid with two biased belts.

The second pressure level is held while the press 19 is partially open for a time interval sufficient to retain the belts 14 and 16 in expanded position while the carcass cords 12 under the belts stretch to be disposed at substantially 0° with respect to the axis of the tire as shown in FIGS. 2B and 3.

The best time interval has been found to be in the range of 5–10 seconds and the best second pressure level has been found to be about 30 psig (206 KPa).

After the pressure holding time interval has elapsed and the press remains partially open, the pressure in bladder 24 is lowered from the second pressure level to about the same as the first pressure level through drain 38 to insure ready closure of press 19 about the tire band TB.

Figure 4:
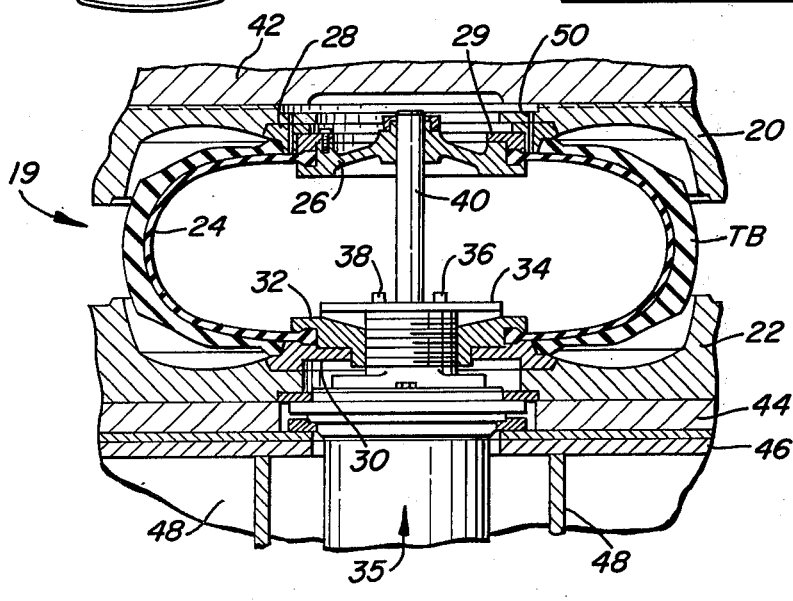
FIG. 4 is cross-sectional view of part of a tire mold such as shown and described in U.S. Pat. No. 2,715,245.

FIG. 4 shows the tire band TB to be expanded into a generally circular U-shape at about the phase when the pressure is being lowered and prior to closing press 19.

After lowering the pressure in bladder 24 to about the first pressure level, the press 19 is fully closed.

The higher molding and curing steam pressure is then applied through conduit 36 and the tire band TB is finally shaped into the mold sections 20 and 22 of press 19 and cured as usual.

The press 19 generally remains partially open to a distance in the range of about 6–7 inches (15–18 cm) until the pressure is reduced to about the first pressure level.

The press 19 may be continuously closing during the above described steps, or stopped until the pressure is returned to the first lower pressure level, then closed.

The steam curing pressure may be about 180 psig (1240 KPa) with corresponding temperature.

The foregoing description in view of the drawing will suggest variations to those skilled in the art, all of which are intended to be included in spirit of the invention as herein set forth.

That being claimed is:

1. A method of forming a belted radial tire from a cylindrical radial green tire band of the type having biased corded belts adapted to pantograph and expand circumferentially as the tire band is shaped to be molded into a finished tire without S-ing of the radial cords of the carcass plies under the belts of the finished tire as may be caused by the pantograph action of the belts while the tire band is being expanded into finished shape, the steps comprising:
    1. lowering a belted radial green tire band of generally cylindrical shape into a conventional tire molding press over the inflatable curing bladder until the lower bead of the tire band is seated in the lower bead seat of the press, then applying inflation pressure into the curing bladder to a first pressure level while partially closing the press;
    2. continuing to apply inflation pressure to a greater second pressure level while continuing to close the press wherein said belts pantograph and circumferentially expand primarily through partially closing the press and applying pressure up to said second pressure level until said tire band has reached a generally circular U-shape;
    3. holding the pressure to said second pressure level while the press is in partially open position for a sufficient time interval to retain the belts in expanded position while the carcass cords under the belts stretch to be disposed at substantially 0° with respect to the tire axis;
    4. lowering the pressure from said second pressure level to about the same as said first pressure level to permit ready closure of the press about said tire band; and
    5. fully closing said press and applying higher molding pressure and temperature to cure the tire band into a finished tire as usual.

2. The method of claim 1 wherein said press is partially open at a distance of about 6 to 7 inches (15–18 cm) between the mold sections of said press as the pressure is lowered to about said first pressure level.

3. The method of claim 1 wherein said first pressure level is about 25 psig (172 KPa).

4. The method of claim 1 wherein said second pressure level is about 30 psig (206 KPa).

5. The method of claim 1 wherein said time interval for applying said second pressure level is in the range of about 5 to 10 seconds.

6. The method of claim 4 wherein said press is partially open at a distance of about 6 to 7 inches (15–18 cm) between the mold-sections of said press when the pressure is lowered to about said first pressure level.

7. The method of claim 6 wherein said first pressure level is about 25 psig (172 KPa).

8. The method of claim 3 wherein said second pressure level is about 30 psig (206 KPa).

9. The method of claim 8 wherein said time interval for applying said second pressure is in the range of about 5 to 10 seconds.

10. The method of claim 1 wherein said press is stopped at said partially open position.

11. The method of claim 1 wherein said press continues to close at said partially open position.

* * * * *